(12) United States Patent
Park et al.

(10) Patent No.: US 8,508,690 B2
(45) Date of Patent: Aug. 13, 2013

(54) OPTICAL ELEMENT AND BACKLIGHT UNIT AND LIQUID CRYSTAL DISPLAY HAVING THE SAME

(75) Inventors: Jeong-Ho Park, Seoul (KR); Young-Soo Do, Seoul (KR); Oh-Hyun Kwon, Seoul (KR)

(73) Assignee: LMS Co., Ltd (KR)

( * ) Notice: Subject to any disclaimer, the term of this patent is extended or adjusted under 35 U.S.C. 154(b) by 260 days.

(21) Appl. No.: 12/537,820

(22) Filed: Aug. 7, 2009

(65) Prior Publication Data

US 2010/0039586 A1   Feb. 18, 2010

(30) Foreign Application Priority Data

Aug. 12, 2008 (KR) .................. 10-2008-0078968

(51) Int. Cl.
*G02F 1/1335* (2006.01)

(52) U.S. Cl.
USPC ............. 349/64; 349/57; 349/65; 349/95

(58) Field of Classification Search
None
See application file for complete search history.

(56) References Cited

U.S. PATENT DOCUMENTS

| | | | |
|---|---|---|---|
| 5,598,280 A * | 1/1997 | Nishio et al. | 349/57 |
| 5,600,455 A * | 2/1997 | Ishikawa et al. | 349/57 |
| 5,956,107 A | 9/1999 | Hashimoto et al. | |
| 6,011,601 A | 1/2000 | Kojima | |
| 6,825,583 B2 | 11/2004 | Joung et al. | |
| 7,252,428 B2 | 8/2007 | Lee et al. | |
| 7,309,149 B2 | 12/2007 | Lee et al. | |
| 7,380,970 B2 | 6/2008 | Hwang et al. | |
| 7,391,571 B2 | 6/2008 | Lee et al. | |
| 7,401,967 B2 | 7/2008 | Wei et al. | |
| 7,407,317 B2 | 8/2008 | Lee et al. | |
| 7,413,335 B2 | 8/2008 | Lee et al. | |
| 7,414,788 B2 | 8/2008 | Lee et al. | |
| 7,445,361 B1 | 11/2008 | Hsu et al. | |
| 7,448,095 B1 | 11/2008 | Agaeliaho | |
| 7,448,787 B2 * | 11/2008 | Kim et al. | 362/620 |
| 7,490,963 B2 | 2/2009 | Fang et al. | |
| 7,585,094 B2 | 9/2009 | Chang | |
| 7,940,461 B2 * | 5/2011 | Chao et al. | 359/599 |
| 2004/0125588 A1 * | 7/2004 | Ho | 362/31 |
| 2008/0088933 A1 * | 4/2008 | Lin | 359/599 |
| 2008/0111948 A1 * | 5/2008 | Epstein et al. | 349/64 |
| 2008/0309847 A1 * | 12/2008 | Aritake et al. | 349/64 |
| 2010/0027294 A1 * | 2/2010 | Lee et al. | 362/620 |

* cited by examiner

*Primary Examiner* — Thanh-Nhan P Nguyen
(74) *Attorney, Agent, or Firm* — Emerson Thomson Bennett, LLC; Daniel A. Thomson

(57) ABSTRACT

An optical element capable of increasing an angular field while improving luminance by condensing light, and a backlight unit and a liquid crystal display including the same. The optical element includes a light-transmitting base film; a plurality of diffusing cavities or convex diffusing structures formed in one surface of the base film to diffuse light entering the base film; and a light-condensing pattern formed in the surface of the base film where the diffusing cavities or convex diffusing structures are formed so as to condense incident light.

6 Claims, 13 Drawing Sheets

LIGHT SOURCE

LIGHT SOURCE

OPTICAL ELEMENT AND BACKLIGHT UNIT AND LIQUID CRYSTAL DISPLAY HAVING THE SAME

CROSS REFERENCE TO RELATED APPLICATION

The present application claims priority to Korean Patent Application Number 10-2008-0078968 filed on Aug. 12, 2008, the entire contents of which application is incorporated herein for all purposes by this reference.

BACKGROUND OF THE INVENTION

1. Field of the Invention

The present invention relates to an optical element used in a backlight unit for a liquid crystal display and, more particularly, to an optical element capable of increasing an angular field while improving luminance by condensing light, and a backlight unit and a liquid crystal display including the same.

2. Description of the Related Art

As is well known in the art, a liquid crystal display (LCD) is widely used as an image display means of various devices such as a personal computer (e.g., a notebook and a desktop computer) and TV. The LCD is rapidly improving its features every year in order to meet user requests.

The liquid crystal panel of an LCD requires a backlight unit since it does not spontaneously emit light on its own. The backlight unit is composed of a variety of optical components, and in particular, includes an optical element for improving luminance.

In the accompanying drawings, FIG. 1 is a schematic configuration view illustrating a conventional LCD. The LCD includes a backlight unit 1 and a liquid crystal panel 2. The backlight unit 1 includes a light source 10, a light guide plate 12, a diffuser sheet 13, and a prism sheet 14. With this configuration, light emitted from the light source is diffused across a wide area through the light guide plate 12, is converted into a surface light source with a more-uniform brightness through the diffuser sheet 13, and is then condensed to a higher luminance through the prism sheet 14.

The optical element used in the above-described LCD has undergone technical development aimed improving a light-condensing function for the purpose of high luminance. This is because the LCD is mainly used in personal electronics such as a mobile communication device and a notebook computer, in which an angular field is relatively less important.

Recently, the importance of achieving a wider angular field continues to increase. For example, an LCD TV requires a wider angular field so that several people in various positions can watch at the same time. A navigator of a vehicle also requires a wider angular field so that both the driver and the passenger in the seat next to the driver can watch the screen at the same time.

Conventional methods for satisfying the above-mentioned requirements of improving luminance and enlarging an angular field include a method of layering a plurality of diffuser sheets one on another and a method of diffracting and diffusing light by inserting nano-particle beads into the top edge of a prism.

However, luminance is lowered if three or more diffuser sheets are layered one on another. This is an obstacle in the way of designing a thin product. In addition, the inserted beads are expensive and thus reduce economic competitiveness due to an increase in cost.

The information disclosed in this Background of the Invention section is only for enhancement of understanding of the background of the invention and should not be taken as an acknowledgment or any form of suggestion that this information forms the prior art that is already known to a person skilled in the art.

BRIEF SUMMARY

Various aspects of the present invention provide an optical element capable of increasing an angular field while improving luminance by condensing light incident from a light source.

There are provided a backlight unit and a liquid crystal display (LCD) having the optical element.

In an aspect of the invention, the optical element may include a light-transmitting base film; a plurality of diffusing cavities or convex diffusing structures formed in one surface of the base film to diffuse light entering the base film; and a light-condensing pattern with light-condensing formed in the surface of the base film where the diffusing cavities or convex diffusing structures are formed so as to condense incident light.

Each of the diffusing cavities or convex diffusing structures may have a hemispherical curved surface, an oval curved surface, or an aspheric curved surface.

The diameter of the diffusing cavities or convex diffusing structures may be greater than the width of the light-condensing protrusions.

The diffusing cavities or convex diffusing structures may have a ratio of a diameter to a depth ranging from 1:0.05 to 1:5.

The diffusing cavities or convex diffusing structures may have an area ratio ranging from 1% to 78.5% with respect to a total area of one surface of the base film.

The diffusing cavities or convex diffusing structures may have a ratio of a major axis to a minor axis ranging from 1.1:1 to 50:1.

A plurality of the diffusing cavities or convex diffusing structures may be arrayed regularly or irregularly along horizontal and vertical directions.

The diffusing cavities or convex diffusing structures may include diffusing cavities each forming a hemispherical curved surface and diffusing cavities each forming an oval curved surface, which are mixed with each other in one surface of the base film. The minor axis of the diffusing cavities or convex diffusing structures is greater than the width of the light-condensing protrusions. Also, the major axis of the oval diffusing cavities or convex diffusing structures is parallel to a lengthwise direction of the light-condensing pattern.

In another aspect of the invention, the backlight unit may include the above-described optical element.

In a further aspect of the invention, the liquid crystal display may include the above-described backlight unit.

According to embodiments of the invention, not only a wider angular field but also an improved luminance can be achieved since light entering the base film is diffused by the diffusing cavities and condensed by the light-diffusing pattern. Compared to the conventional method in which a plurality of diffuser sheets are layered one on another, the thickness of a product can be reduced. Moreover, compared to the conventional method in which beads are inserted, manufacturing cost can be reduced.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
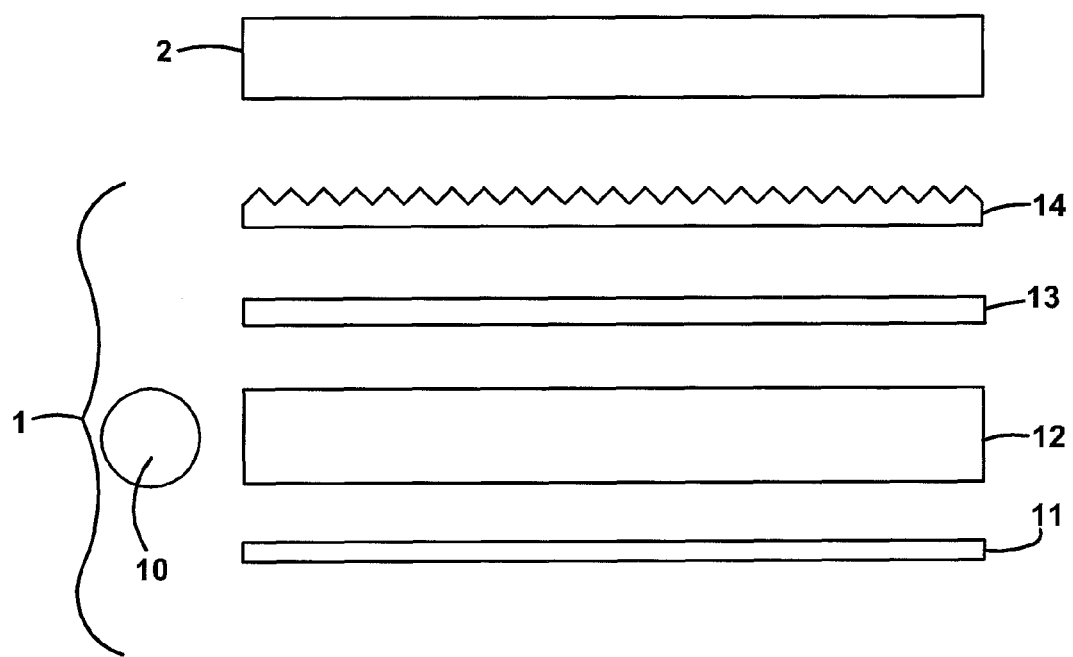
FIG. 1 is a schematic configuration view illustrating a conventional LCD.
Figure 2:
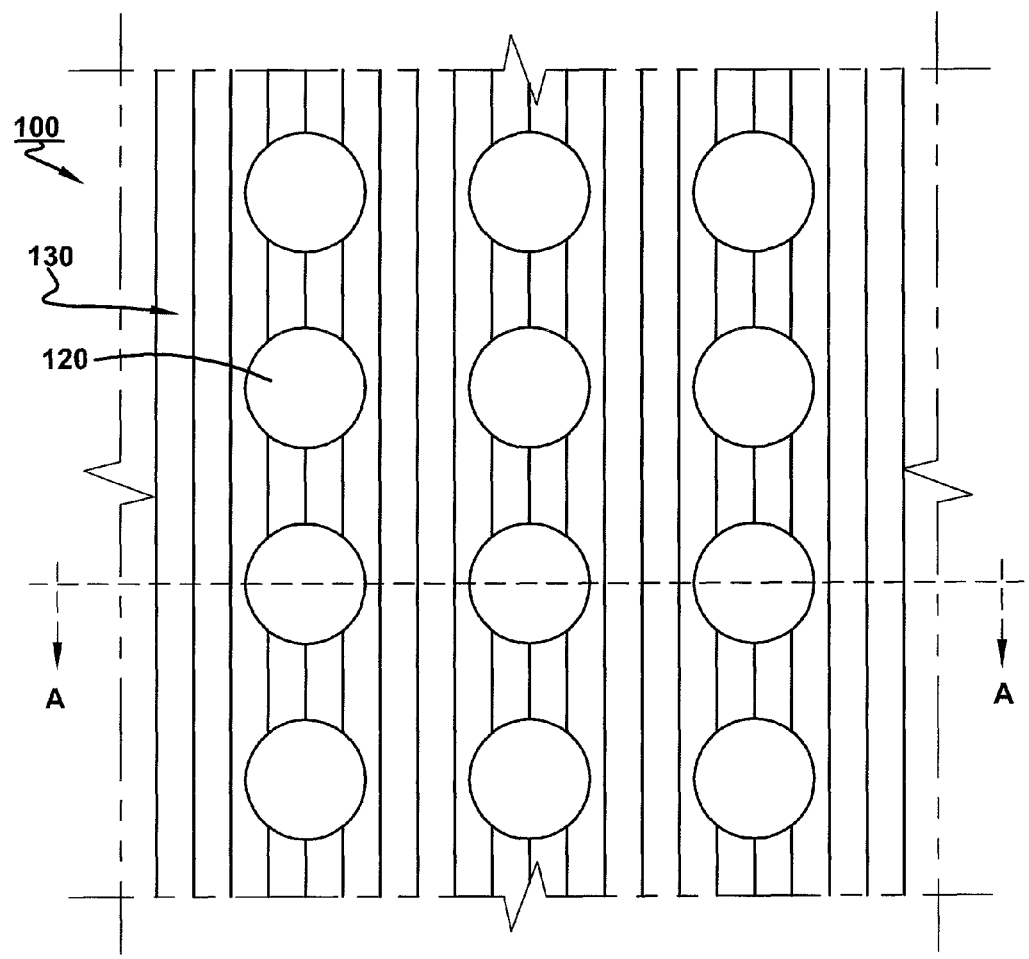
FIG. 2 is a top plan view illustrating a first embodiment of an optical element in accordance with the invention.
Figure 3:
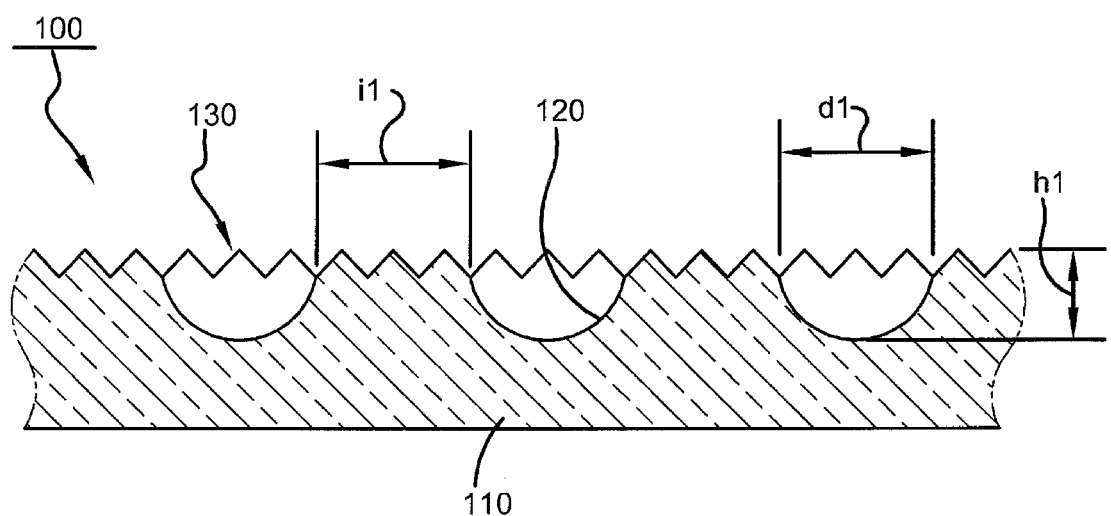
FIG. 3 is a cross-sectional view taken along line A-A of FIG. 2.

As shown in FIGS. 2 and 3, a first embodiment of an optical element 100 in accordance with the invention includes a light-transmitting base film 110, a plurality of diffusing cavities 120, and a light-condensing pattern 130. The diffusing cavities 120 are provided in the upper surface of the base film 110 to diffuse incident light. The light-condensing pattern 130 is provided in the upper surface of the base film 110, where the diffusing cavities 120 are provided, in order to condense incident light.

The base film 110 is made of a thin film, capable of transmitting light emitted from a light source. The base film 110 can be made of a plastic material having excellent transmittance, which is selected from the group consisting of polyethylene (PE), polypropylene (PP), polymethyl methacrylate (PMMA), poly carbonate (PC), and polyethylene terephthalate (PET).

The diffusing cavities 120 are integrally formed in the upper surface of the base film 110 to diffuse light in various directions. As shown in FIGS. 2 and 3, each of the diffusing cavities 120 forms a hemispherical surface. In other words, the diffusing cavity 120 is shaped as a hemisphere having a curved surface for diffusing incident light. As shown in FIG. 2, the diffusing cavities 120 are regularly arrayed in a matrix along the horizontal and vertical directions with equal intervals. Alternatively, the diffusing cavities 120 can be arrayed irregularly along the horizontal and vertical directions with different intervals (so that horizontal and/or vertical lines are not parallel to each other. In FIG. 3, the reference letter "i1" denotes an interval between adjacent diffusion cavities 120.

It should be understood that the diffusing cavities 120 can be alternatively formed in the underside of the base film 110.

In the diffusing cavities 120, the ratio of the diameter d1 to the depth h1 can preferably be in the range from 1:0.05 to 1:5.

Figure 4A:
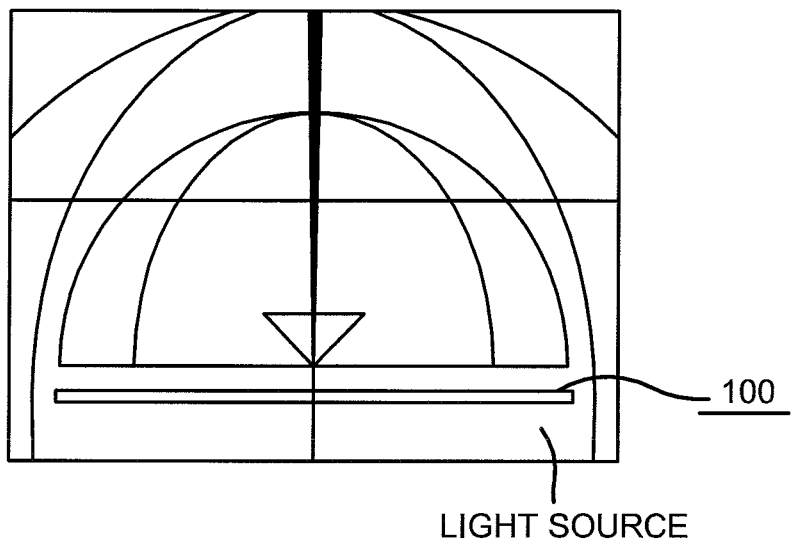
FIGS. 4A and 4B are graphs illustrating the results of simulation performed by setting the diameter and depth of the diffusing cavity at a predetermined ratio.

FIG. 4A shows the result of simulation performed by setting the ratio of the diameter d1 to the depth h1 of the diffusion cavity 120 to be 1:0.04. When the ratio of the diameter d1 to the depth h1 of the diffusion cavity 120 is 1:0.04, light incident from the light source is emitted with an angle of refraction less than 5°. As a result, light-diffusing power is not sufficient.

Figure 4B:
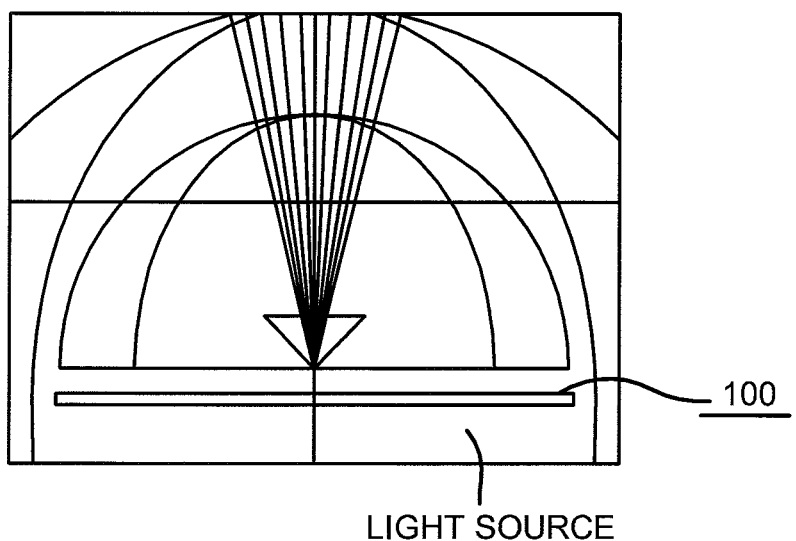

In contrast, FIG. 4B shows the results of simulation performed by setting the ratio of the diameter to the depth of the diffusing cavity 120 to be 1:5. When the ratio of the diameter to the depth of the diffusing cavity 120 is 1:5, light incident from the light source is emitted with a large angle of refraction. Accordingly, the light-diffusing power can be maximized.

Preferably, the ratio of the diameter d1 to the depth h1 of the diffusing cavity 120 does not exceed 1:5. If the ratio of the diameter d1 to the depth h1 of the diffusing cavity 120 exceeds 1:5, the depth h1 of the diffusing cavity 120 is excessive. Then, neither the cavities nor the base film can be easily manufactured. Furthermore, this also leads to a decline in luminance, thereby degrading industrial applicability.

In addition, the diffusing cavities 120 can preferably occupy 1% to 78.5% of the total area of the upper surface of the base film 110. Referring to FIG. 2, for example, if the base film 110 has a two dimensional area 10 cm×10 cm (=100 cm$^2$) and the radius of each diffusing cavity 120 is 0.5 cm, the twelve (12) diffusing cavities 120 occupy a total area of 12×0.5×0.5×π=9.42 cm$^2$. Thus, the ratio of the total area of the diffusing cavities 120 to the total area of the upper surface of the base film 110 is 9.42%. The remaining 90.58% is occupied by the light-condensing pattern 130.

Since the invention is directed to not only improve the luminance of light but also enhance the diffusion of light, the area ratio of the diffusing cavities 120 to the total area of the upper surface of the base film 110 can preferably be in the range from 1% to 78.5%. More preferably, the area ratio can be in the range from 10% to 50%. If the area ratio of the diffusing cavities 120 exceeds 78.5%, the cavities do not improve luminance compared to the pattern exclusively composed of the diffusing cavities 120. The area ratio of the diffusing cavities 120 less than 1% is too small to expect any effect in the light-diffusing power.

Figure 5:
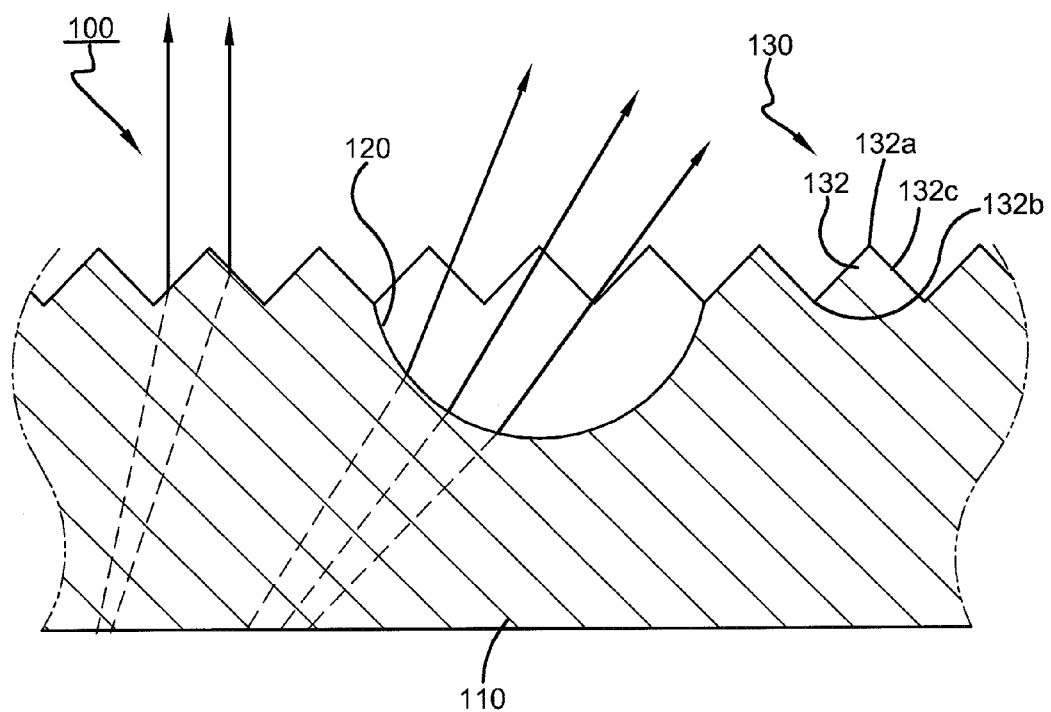
FIG. 5 is a cross-sectional view illustrating light transmission directions by enlarging the key part of FIG. 3.

In the upper surface of the base film 110 where the above-described diffusing cavities 120 are located, the light-condensing pattern 130 is integrally provided to condense incident light. The light-condensing pattern 130 includes a plurality of light-condensing protrusions 132 that are connected with each other. Each of the light-condensing protrusions 132 has two or more light-condensing surfaces, which are not parallel to each other. The light-condensing surfaces refract incident light so that it can be vertically emitted. As shown in FIGS. 3 and 5, the light-condensing protrusion 132 has a triangular cross section including both oblique light-condensing surfaces 132, which are inclined with respect to the upper surface of the base film. Thus, as shown in FIG. 3, the light-condensing protrusions 132 of the light-condensing pattern 130 continue side by side without interruption. Specifically, in the light-condensing protrusions 132 of the light-condensing pattern 130, top edges 132a and bottom edges 132b are continuously and repeatedly formed.

It is apparent that the light-condensing protrusions 132 can be formed in a variety of optical patterns, such as an equilateral triangular pattern, a lenticular pattern, and a chaos pattern, in order to condense light.

Of course, the light-condensing pattern 130 can be selectively provided in the underside of the base film 110 where the diffusing cavities are formed 120. Also, The diameter of the diffusing cavities 120 may be greater than the width of the light-condensing protrusions 132, preferably.

FIG. 5 an enlarged view showing the directions of light transmitting through the diffusing cavity 120 and the light-condensing pattern 130, which are provided in the upper surface of the base film 110. Light incident through the underside of the base film 110 is partially diffused in various directions by the diffusing cavity 120 and is partially condensed by the light-condensing pattern 130 before being vertically emitted from the base film 110. This feature, as a result, can enlarge an angular field while improving luminance.

Figure 6A:
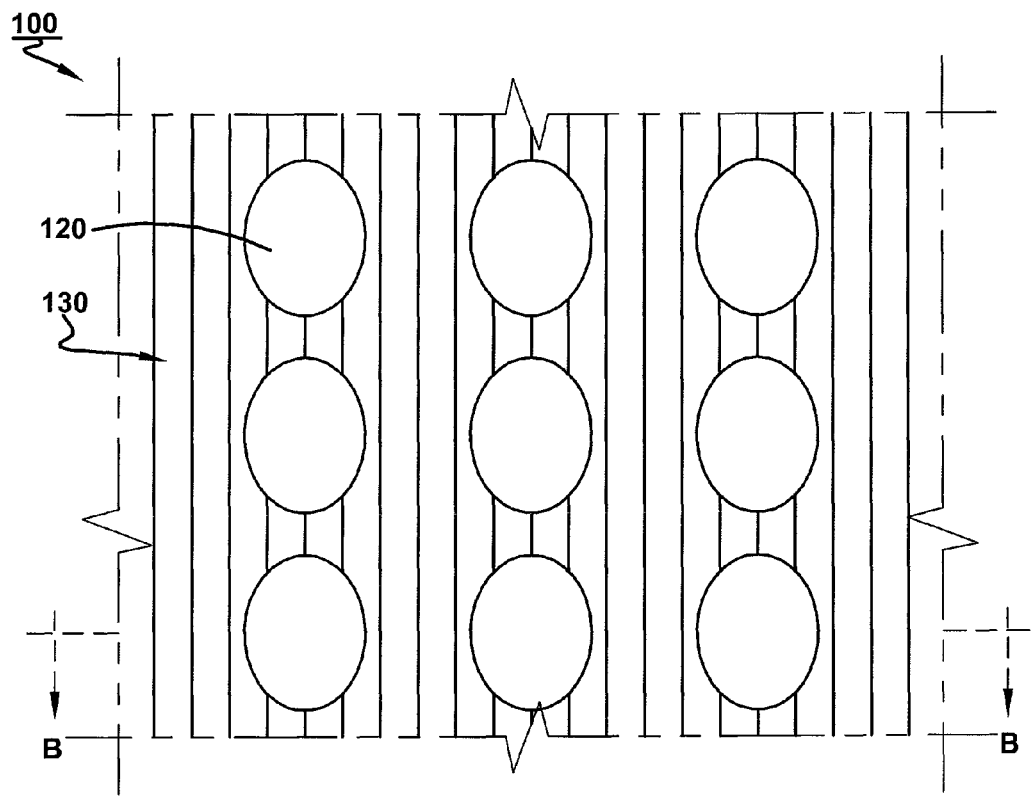
FIG. 6A is a top plan view illustrating an alternative to the diffusing cavity of the first embodiment of the optical element in accordance with the invention.
Figure 6B:
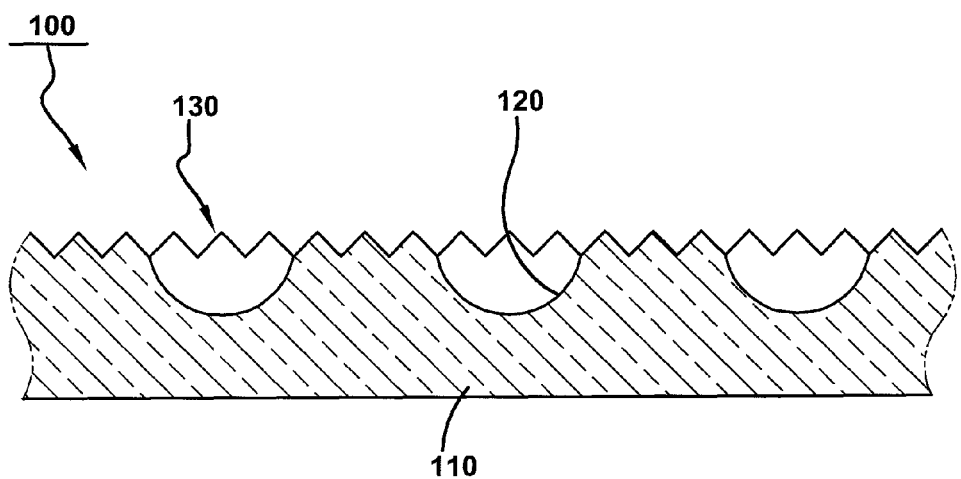
FIG. 6B is a cross-sectional view taken along line B-B of FIG. 6A.

FIG. 6A is a top plan view illustrating an alternative to the diffusing cavities 120 of the first embodiment of the optical element in accordance with the invention, and FIG. 6B is a cross-sectional view taken along line B-B of FIG. 6A. As shown in FIG. 6A, each of the light-diffusing cavities 120 is configured to form an oval curved surface.

As described above, the diffusing cavities 120 are provided in the upper surface of the base film 110 in order to diffuse incident light in various directions. While the diffusing cavities 120 are regularly arrayed along the horizontal and vertical directions with equal intervals, they can also be arrayed irregularly along the horizontal and vertical directions with different intervals if necessary.

As shown in FIG. 6A, the oval diffusing cavities 120 are configured to have major and minor axes on the plane. The ratio of the major axis to the minor axis of each diffusing cavity can preferably be in the range from 1.1:1 to 50:1 since the light-diffusing power gradually decreases in reverse proportion to the ratio of the major axis to the minor axis of the diffusing cavity. If the ratio of the major axis to the minor axis of the diffusing cavity exceeds 50:1, the light-diffusing power coming from the diffusing cavities is not sufficient compared to the light-condensing protrusions. Preferably, the minor axis of the diffusing cavities 120 is greater than the width of the light-condensing protrusions 132. And, the major axis of the oval diffusing cavities 120 is parallel to a lengthwise direction of the light-condensing pattern 130.

Figure 7A:
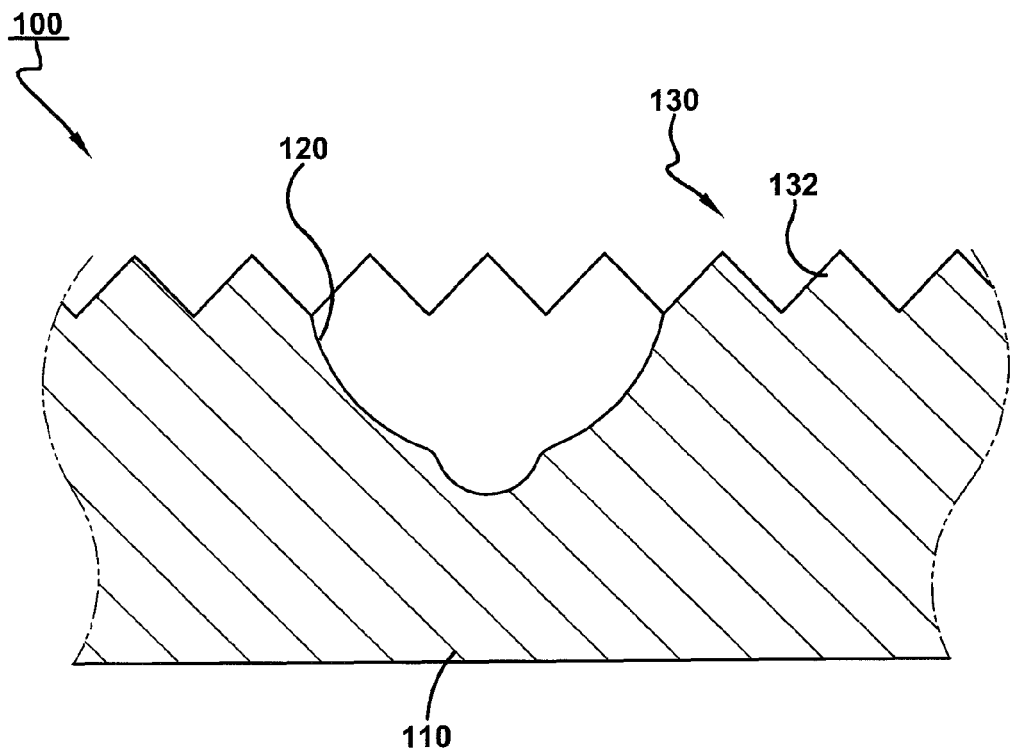
FIGS. 7A and 7B are cross-sectional views illustrating other alternatives to the diffusing cavity of the first embodiment of the optical element in accordance with the invention.
Figure 7B:
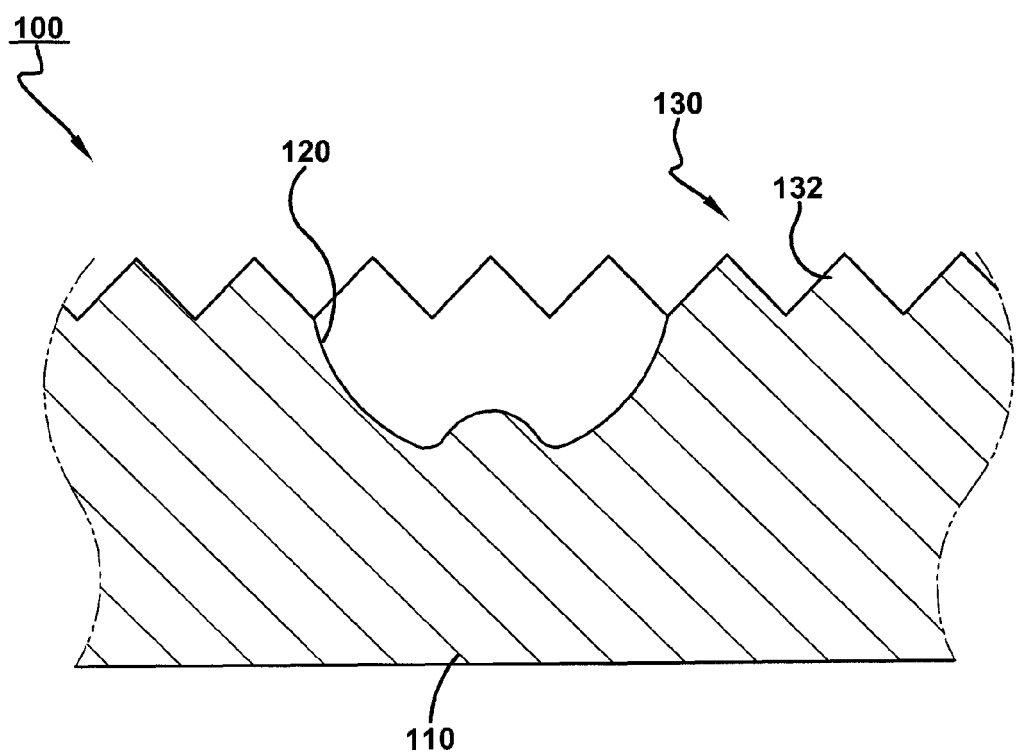

FIGS. 7A and 7B are cross-sectional views illustrating other alternatives to the diffusing cavity 120 of the first embodiment of the optical element in accordance with the invention. The light-diffusing cavity 120 is configured to form an aspheric curved surface.

The curved surface of the aspheric diffusing cavity 120 does not maintain the same or regular distance to the center. Rather, the distance of the aspheric curved surface of the diffusing cavity 120 to the center shows great changes including a rapid increase and decrease.

Figure 8:
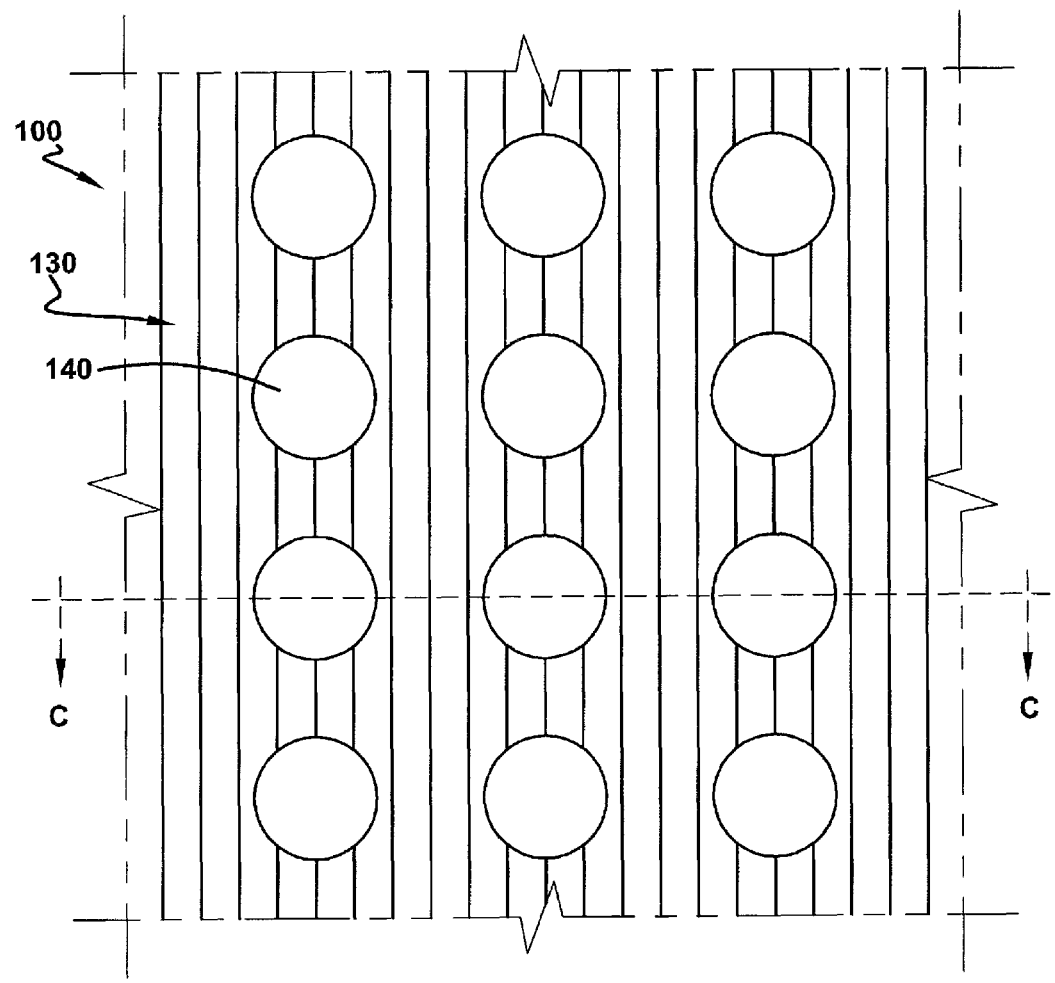
FIG. 8 is a top plan view illustrating a second embodiment of an optical element in accordance with the invention.
Figure 9:
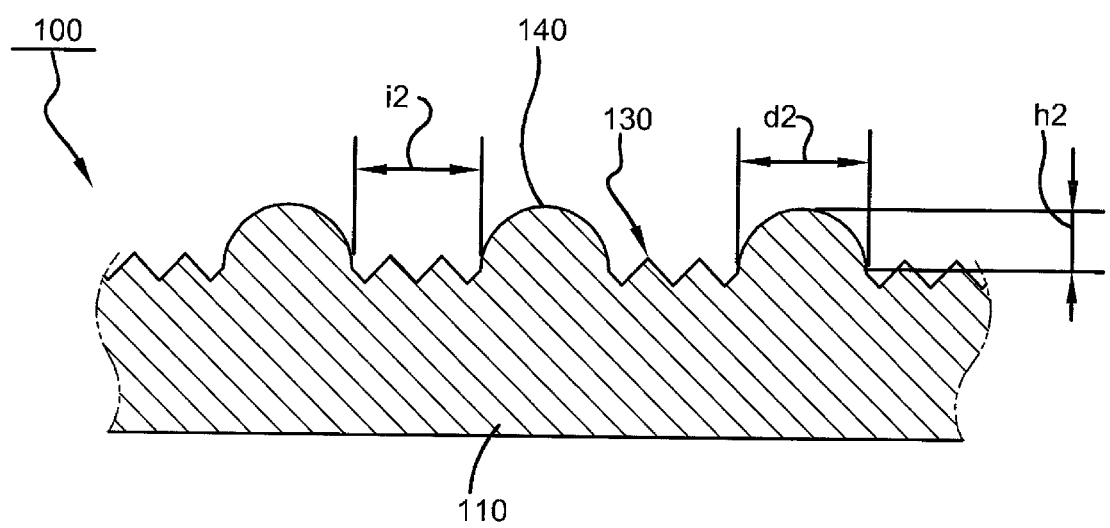
FIG. 9 is a cross-sectional view taken along line C-C of FIG. 8.
Figure 10:
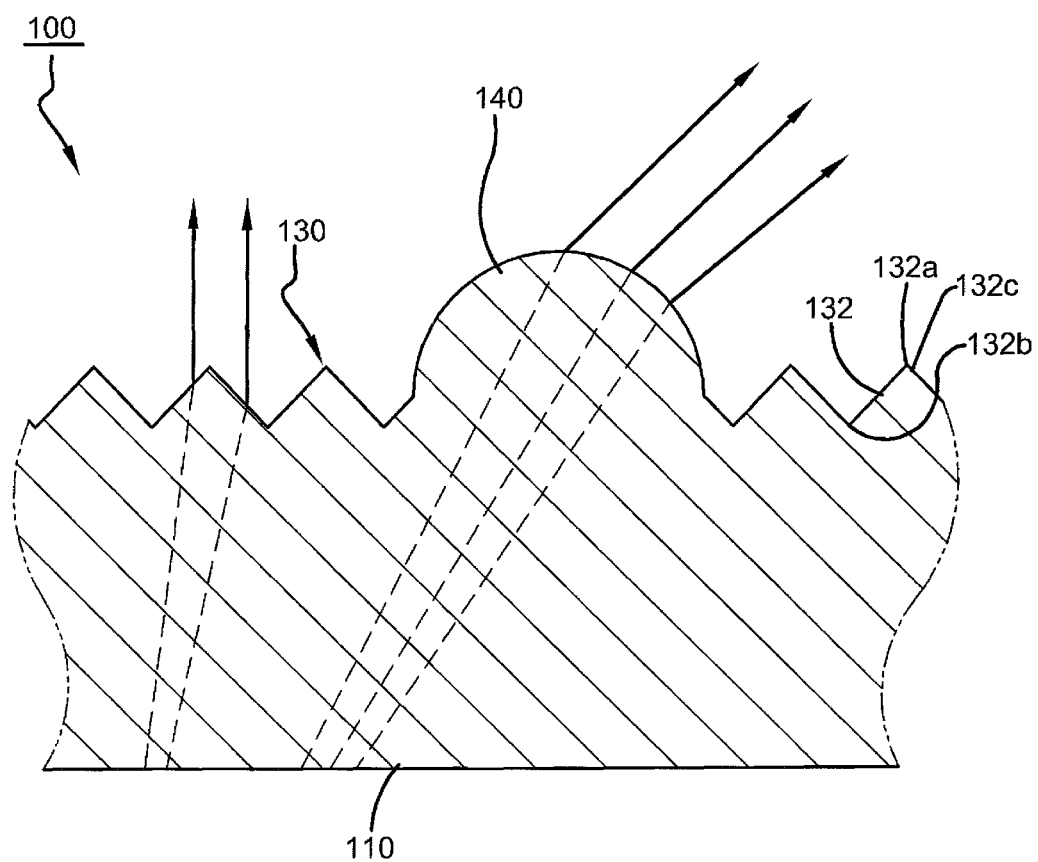
FIG. 10 is a cross-sectional view illustrating light transmission directions by enlarging the key part shown in FIG. 9.

FIGS. 8 and 9 are top plan and cross-sectional views illustrating a second embodiment of the optical element in accordance with the invention, and FIG. 10 is an enlarged cross-sectional view illustrating light transmission directions in the optical element shown in FIG. 9. The optical element of this embodiment includes a light-transmitting base film 110, a plurality of convex diffusing structures 140, and a light-condensing pattern 130. The convex diffusing structures 140 are provided in the upper surface of the base film 110 to diffuse incident light. The light-condensing pattern 130 is provided in the upper surface of the base film 110, where the convex diffusing structures 140 are located, in order to condense incident light.

The optical element of this embodiment is characterized by the convex diffusing structures 140 forming a hemispherical surface. Like the above-described diffusing cavities 120, the convex diffusing structures 140 are provided in the upper surface of the base film 110 to diffuse incident light in a variety of directions. While the convex diffusing structures 140 are regularly arrayed along the horizontal and vertical directions with equal intervals, they can also be arrayed irregularly along the horizontal and vertical directions with different intervals if necessary. In the figures, the reference letter "i2" denotes an interval between the adjacent convex diffusing structures 140.

It should be understood that the convex diffusing structures 140 can be alternatively formed in the underside of the base film 110.

Like the above-described diffusing cavities 120, the ratio of the diameter d2 to the depth h of each convex diffusing structure 140 can preferably be in the range from 1:0.05 to 1:5.

The functions and effects related with the ratio of the diameter d2 to the height h2 of the convex diffusing structures 140 and the area ratio of the convex diffusing structures 140 to the total area of the upper surface of the base film 110 are substantially the same as those of the above-described diffusing cavities 120, and thus will not be described repeatedly.

In the upper surface of the base film 110 where the convex diffusing structures 140 are located, the light-condensing pattern 130 is integrally provided to condense incident light. The light-condensing pattern 130 includes a plurality of light-condensing protrusions 132 that are connected with each other. The light-condensing pattern 130 is substantially the same as that described in the first embodiment of the optical element 100, and thus will not be described repeatedly.

FIG. 10 an enlarged view showing the directions of light transmitting through the convex diffusing structure 140 and the light-condensing pattern 130, which are provided in the upper surface of the base film 110. Light incident through the underside of the base film 110 is partially diffused in various directions by convex diffusing structure 140 and is partially condensed by the light-condensing pattern 130 before being vertically emitted from the base film 110. This feature, as a result, can enlarge an angular field while improving luminance.

Figure 11A:
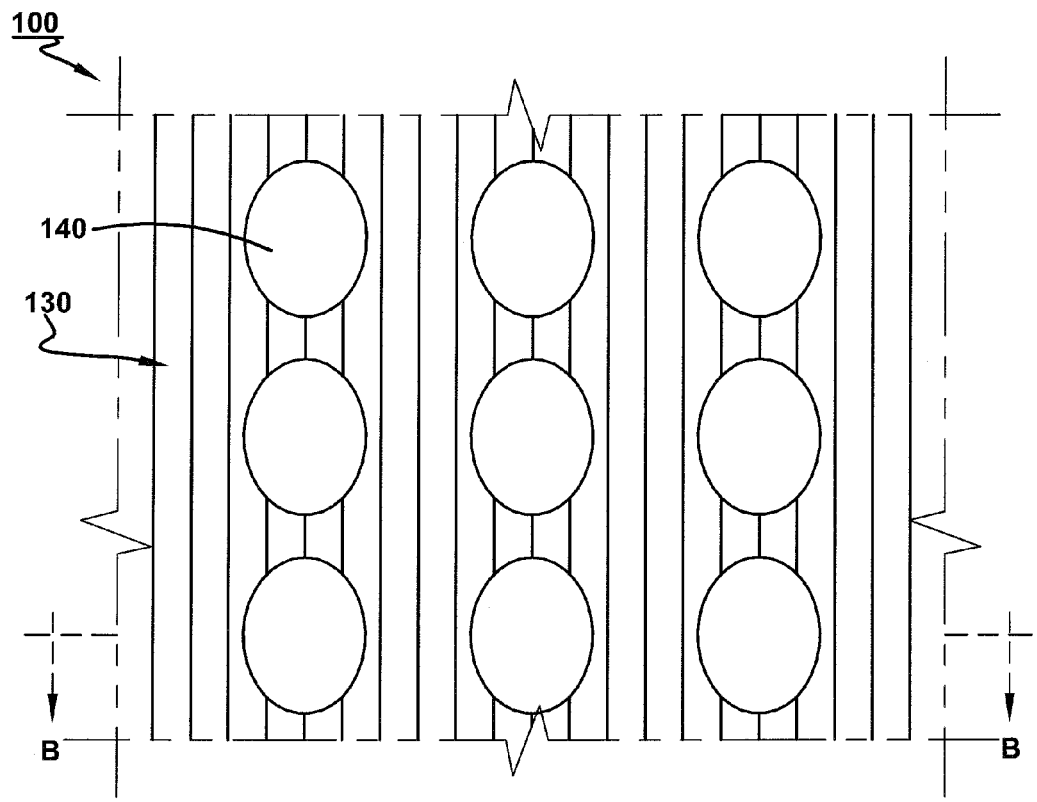
FIG. 11A is a top plan view illustrating an alternative to the convex diffusing structure of the first embodiment of the optical element in accordance with the invention.
Figure 11B:
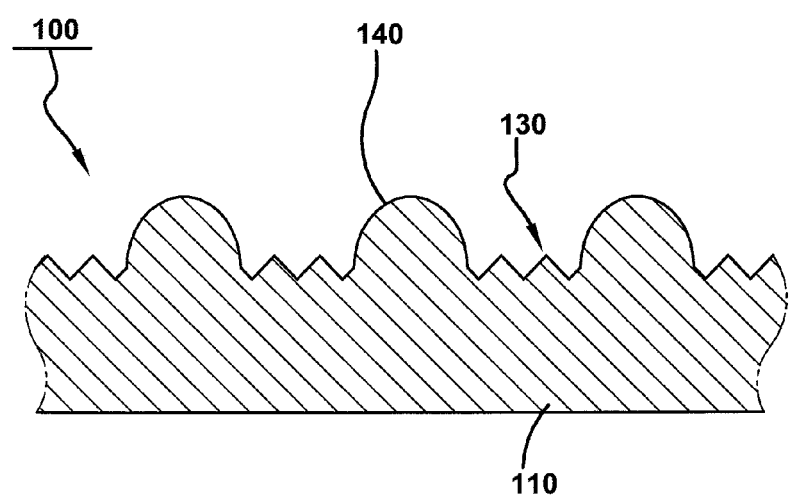
FIG. 11B is a cross-sectional view taken along line B-B of FIG. 11A.

FIG. 11A is a top plan view illustrating an alternative to the convex diffusing structure 140 of the first embodiment of the optical element in accordance with the invention, and FIG. 11B is a cross-sectional view taken along line B-B of FIG. 11A. As shown in FIG. 11A, each of the convex light-diffusing structure 140 is configured to form an oval curved surface.

As described above, the convex diffusing structures 140 are provided in the upper surface of the base film 110 in order to diffuse incident light in various directions. While the convex diffusing structures 140 are arrayed regularly along the horizontal and vertical directions with equal intervals, they can also be arrayed irregularly along the horizontal and vertical directions with different intervals if necessary.

As shown in FIG. 11A, the oval diffusing structures 140 are configured to have major and minor axes on the plane. The ratio of the major axis to the minor axis of each diffusing cavity can preferably be in the range from 1.1:1 to 50:1. The functions and effects related with the ratio of the major axis to the minor axis of the convex diffusing structures 140 are substantially the same as those of the above-described diffusing cavities 120, and thus will not be described repeatedly.

Figure 12A:
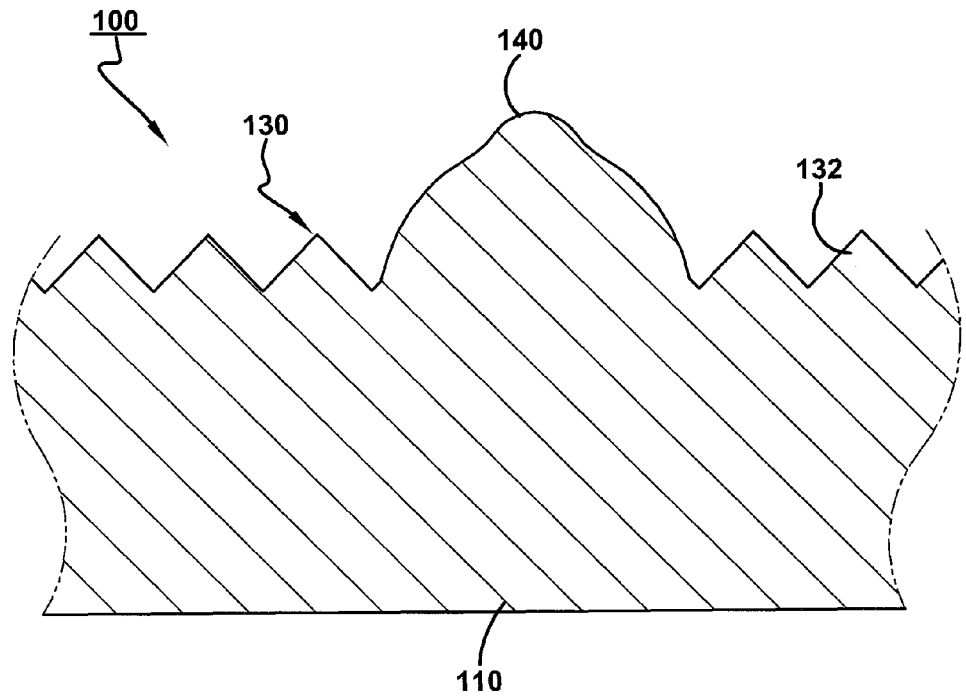
FIGS. 12A and 12B are cross-sectional views illustrating other alternatives to the convex diffusing structure of the second embodiment of the optical element in accordance with the invention.
Figure 12B:
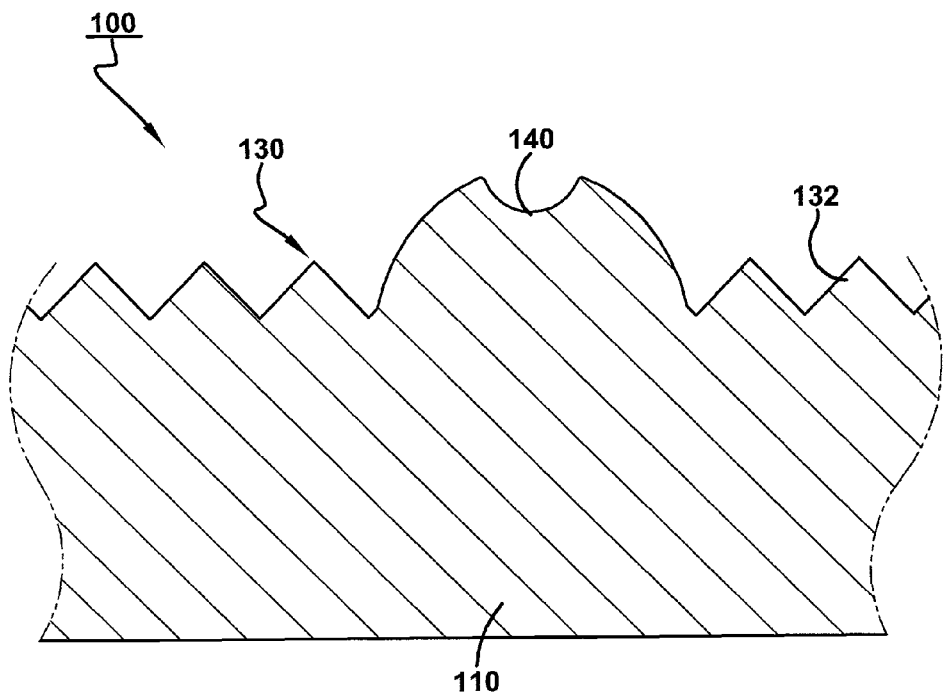

FIGS. 12A and 12B are cross-sectional views illustrating other alternatives to the convex diffusing structure 140 of the second embodiment of the optical element in accordance with the invention.

The curved surface of the aspheric convex diffusing structure 140 does not maintain the same or regular distance to the center. Rather, the distance of the aspheric curved surface of the convex diffusing structure 140 to the center shows great changes including a rapid increase and decrease.

Figure 13:
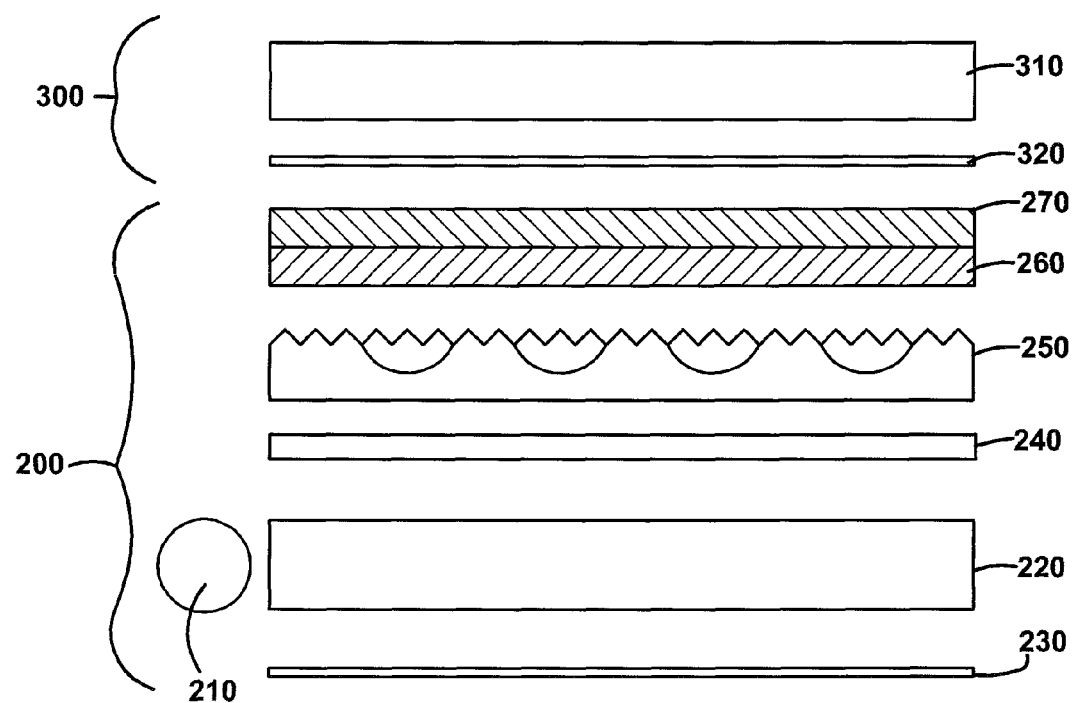
FIG. 13 is a schematic configuration view illustrating an LCD in accordance with the invention.

FIG. 13 is a schematic configuration view illustrating an LCD, which includes the optical element 100 configured as above. The LCD including the optical element 100 of the invention includes a backlight unit 200 and a liquid crystal panel 300.

The backlight unit 200 includes a light source 210, a light guide plate 220, a diffuser sheet 240, and a prism sheet 250. The light source 210 generates light, and the light guide plate 220 diffuses light incident from the light source 210 across the entire area thereof. The diffuser sheet 240 converts light incident from the light guide plate 220 into a surface light source with uniform brightness, and the prism sheet 250 condenses light incident from the prism sheet 240.

Optionally, the backlight unit 200 can also include a reflecting polarizer film 260 and a phase retardation layer 270. The reflecting polarizer film 260 selectively reflects light incident from the prism sheet 250, and the phase retardation layer 270 converts circularly-polarized light, produced by filtering of the reflecting polarizer film 260, into linearly-polarized light.

An absorptive polarizer film 320 is interposed between the backlight unit 200 configured as above and the liquid crystal panel 300. The absorptive polarizer film 320 allows linearly-polarized light from the phase retardation layer 270 to pass through while absorbing 50% of circularly-polarized light.

The optical element 100 of the invention is embodied as the diffuser sheet 240 or the prism sheet 250. Then, a plurality of the incident light-diffusing cavities 120 and the incident light-condensing pattern 130 can be provided in one surface of the diffuser sheet 240 or the prism sheet 250.

Alternatively, a plurality of the convex diffusing structure 140 diffusing incident light and the incident light-condensing pattern 130 can be provided in one surface of the diffuser sheet 240 or the prism sheet 250.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

In addition, the structure and resultant effects of the above-described base film can be, of course, applied to a light guide plate (LGP) or a light guide film (LGF).

Having thus described the invention, it is now claimed:

1. An optical element for condensing or diffusing light which is incident from a light source through a light guide plate comprising:
   a light-transmitting base film including a plurality of diffusing cavities formed in one surface of the base film to diffuse light entering the base film and a light-condensing pattern with a plurality of light-condensing protrusions formed in the surface between adjacent diffusing cavities so as to condense incident light,
   wherein each of the plurality of light-condensing protrusions has two or more oblique light-condensing surfaces which are not parallel to each other,
   wherein the plurality of diffusing cavities are arranged in a first direction and a second direction with a given distance from each other, and the first direction is substantially perpendicular to the second direction, wherein each of the diffusing cavities have a hemispherical curved surface and the diameter of the diffusing cavities is greater than the width of the light-condensing protrusions, wherein the diffusing cavities has a ratio of a diameter to a depth ranging from 1:0.05 to 1:5.

2. The optical element in accordance with claim 1, wherein the diffusing cavities have an area ration ranging from 1% to 78.5% with respect to a total area of one surface of the base film.

3. The optical element in accordance with claim 1, wherein the plurality of the diffusing cavities are arrayed regularly along horizontal and vertical directions.

4. The optical element in accordance with claim 1, wherein at least one distance between adjacent diffusing cavities of the plurality of the diffusing cavities is different from an another distance between adjacent diffusing cavities of the rest of the plurality of the diffusing cavities.

5. A backlight unit having an optical element for condensing or diffusing light which is incident from a light source through a light guide plate comprising:
   the optical element includes a light-transmitting base film including a plurality of diffusing structures formed in one surface of the base film to diffuse light entering the base film and a light-condensing pattern with a plurality of light-condensing protrusions formed in the surface between adjacent diffusing cavities so as to condense incident light,
   wherein each of the plurality of light-condensing protrusions has two or more oblique light-condensing surfaces which are not parallel to each other
   wherein the plurality of diffusing cavities are arranged in a first direction and a second direction with a given distance from each other and the first direction is substantially perpendicular to the second direction, wherein each of the diffusing cavities have a hemispherical curved surface and the diameter of the diffusing cavities is greater than the width of the light-condensing protrusions, wherein the diffusing cavities has a ratio of a diameter to a depth ranging from 1:0.05 to 1:5.

6. A liquid crystal display having an optical element for condensing or diffusing light which is incident from a light source through a light guide plate comprising:
   the optical element includes a light-transmitting base film including a plurality of diffusing cavities formed in one surface of the base film to diffuse light entering the base film and a light-condensing pattern with a plurality of light-condensing protrusions formed in the surface between adjacent diffusing cavities so as to condense incident light,
wherein each of the plurality of light-condensing protrusions has two or more oblique light-condensing surfaces which are not parallel to each other,
wherein the plurality of diffusing cavities are arranged in a first direction and a second direction with a given distance from each other and the first direction is substantially perpendicular to the second direction, wherein each of the diffusing cavities have a hemispherical curved surface and the diameter of the diffusing cavities is greater than the width of the light-condensing protrusions, wherein the diffusing cavities has a ratio of a diameter to a depth ranging from 1:0.05 to 1:5.

* * * * *